(12) United States Patent
Xu et al.

(10) Patent No.: US 12,132,690 B2
(45) Date of Patent: Oct. 29, 2024

(54) SHARING METHOD AND APPARATUS, ELECTRONIC DEVICE, STORAGE MEDIUM, AND COMPUTER PROGRAM PRODUCT

(71) Applicant: Beijing Zitiao Network Technology Co., Ltd., Beijing (CN)

(72) Inventors: Jiannan Xu, Beijing (CN); Yuxuan Zhao, Beijing (CN); Yuchen Peng, Beijing (CN); Yuhang Zhang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/622,801

(22) Filed: Mar. 29, 2024

(65) Prior Publication Data

US 2024/0244016 A1 Jul. 18, 2024

Related U.S. Application Data

(63) Continuation of application No. PCT/CN2022/137871, filed on Dec. 9, 2022.

(30) Foreign Application Priority Data

Dec. 14, 2021 (CN) .......................... 202111530234.3

(51) Int. Cl.
*G06F 15/16* (2006.01)
*G06F 3/0481* (2022.01)
(Continued)

(52) U.S. Cl.
CPC ............ *H04L 51/04* (2013.01); *G06F 3/0481* (2013.01); *H04L 51/216* (2022.05)

(58) Field of Classification Search
CPC ...... H04L 51/04; H04L 51/216; G06F 3/0481
(Continued)

(56) References Cited

U.S. PATENT DOCUMENTS 7,484,175 B2 * 1/2009 Kirkland ........... H04M 1/72439
715/755
7,831,674 B2 * 11/2010 Wang ..................... H04L 51/04
709/204

(Continued)

FOREIGN PATENT DOCUMENTS

| CN | 102074128 A | 5/2011 |
| CN | 102111454 A | 6/2011 |

(Continued)

OTHER PUBLICATIONS

International Search Report in PCT/CN2022/137871, mailed Feb. 8, 2023, 3 pages.

(Continued)

*Primary Examiner* — Moustafa M Meky
(74) *Attorney, Agent, or Firm* — Astute IP Law Group

(57) ABSTRACT

Embodiments of the disclosure provide a sharing method and apparatus, an electronic device, a storage medium, and a computer program product. The method comprises: receiving a sharing operation for sharing a target work to a first target sharing object; sending, in response to the sharing operation, the target work to the first target sharing object in a form of instant messaging message; and displaying, in response to sending the target work to the first target sharing object in a form of instant messaging message, a message control corresponding to the first target sharing object, wherein the message control is configured to send an instant messaging message by triggering a display of an instant messaging message input region.

20 Claims, 6 Drawing Sheets

(51) Int. Cl.
*H04L 51/04* (2022.01)
*H04L 51/216* (2022.01)

(58) Field of Classification Search
USPC .......................................................... 709/206
See application file for complete search history.

(56) References Cited

U.S. PATENT DOCUMENTS

| | | | | |
|---|---|---|---|---|
| 8,706,818 | B2* | 4/2014 | Krzyzanowski | ............................. |
| | | | | H04N 21/42209 |
| | | | | 709/205 |
| 9,832,252 | B2* | 11/2017 | Sylvain | ................... H04L 67/02 |
| 10,237,311 | B2* | 3/2019 | Dange | ................. H04L 65/1069 |
| 10,587,837 | B2* | 3/2020 | Wan | ................... H04N 21/2393 |
| 11,070,500 | B2* | 7/2021 | Phan | ..................... H04L 67/133 |
| 11,956,531 | B2* | 4/2024 | Wang | ....................... H04L 51/10 |
| 11,960,529 | B2* | 4/2024 | Shay | ..................... G06F 16/5866 |
| 2008/0071870 | A1* | 3/2008 | Zhan | ........................ G06F 9/453 |
| | | | | 709/206 |
| 2008/0109741 | A1* | 5/2008 | Messing | ................ G06Q 10/10 |
| | | | | 715/764 |
| 2018/0097856 | A1* | 4/2018 | Dange | ................... H04L 65/403 |
| 2018/0183738 | A1* | 6/2018 | Parnell | .................... G06Q 50/01 |
| 2021/0099502 | A1* | 4/2021 | Stern | ............. G06Q 10/063114 |
| 2021/0110579 | A1* | 4/2021 | Cao | ......................... G06V 20/10 |
| 2021/0150243 | A1* | 5/2021 | Wang | ..................... G06F 3/0488 |
| 2021/0243045 | A1 | 8/2021 | Chen | |
| 2021/0266275 | A1* | 8/2021 | Kim | ......................... H04L 51/04 |
| 2022/0239986 | A1* | 7/2022 | Kang | ...................... H04L 51/04 |
| 2022/0374460 | A1* | 11/2022 | Yu | ........................... G06N 20/00 |

FOREIGN PATENT DOCUMENTS

| | | |
|---|---|---|
| CN | 103856395 A | 6/2014 |
| CN | 104615339 A | 5/2015 |
| CN | 106453054 A | 2/2017 |
| CN | 106973330 A | 7/2017 |
| CN | 109144346 A | 1/2019 |
| CN | 109889662 A | 6/2019 |
| CN | 111670437 A | 9/2020 |
| CN | 114217707 A | 3/2022 |
| WO | 2021/083112 A1 | 5/2021 |
| WO | 2021/023888 A1 | 12/2021 |
| WO | 2021/238884 A1 | 12/2021 |

OTHER PUBLICATIONS

Notice of Allowance in Chinese Patent Application No. 202111530234.3, mailed Dec. 25, 2023, 12 pages.

Office Action in Chinese Patent Application No. 202111530234.3, mailed Apr. 12, 2023, 14 pages.

* cited by examiner

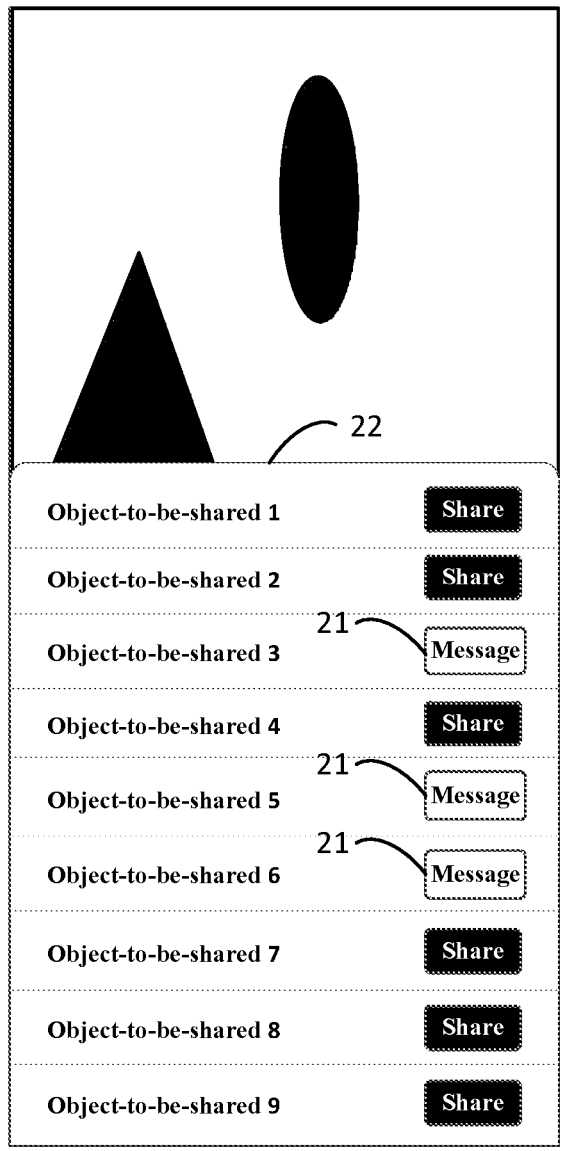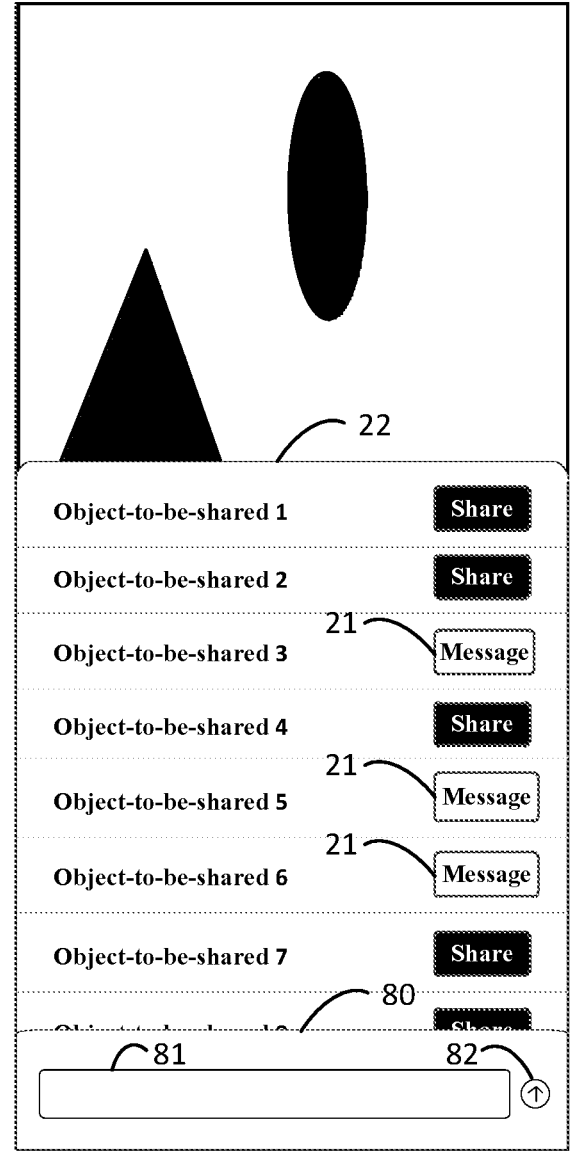
Fig.7                                   Fig.8

SHARING METHOD AND APPARATUS, ELECTRONIC DEVICE, STORAGE MEDIUM, AND COMPUTER PROGRAM PRODUCT

CROSS-REFERENCE TO RELATED APPLICATION(S)

This application is a Continuation Application of International Patent Application No. PCT/CN2022/137871, filed on Dec. 9, 2022, which claims priority to Chinese Patent Application No. "202111530234.3", filed with China National Intellectual Property Administration on Dec. 14, 2021, the disclosures which are incorporated herein by reference in their entirety.

FIELD

Embodiments of the disclosure relate to the field of the computer technology, and for example, relate to a sharing method and apparatus, an electronic device, a storage medium, and a computer program product.

BACKGROUND

In the related art, when watching a video, users may select friends in batches to share the video they are currently watching, and may input a message before sharing, so as to leave a message for the selected friends during sharing.

SUMMARY

Embodiments of the disclosure provide a sharing method and apparatus, an electronic device, a storage medium, and a computer program product.

In a first aspect, an embodiment of the disclosure provides a sharing method, comprising:
  receiving a sharing operation for sharing a target work to a first target sharing object;
  sending, in response to the sharing operation, the target work to the first target sharing object in a form of instant messaging message; and
  displaying, in response to sending the target work to the first target sharing object in a form of instant messaging message, a message control corresponding to the first target sharing object, wherein the message control is configured to send an instant messaging message by triggering a display of an instant messaging message input region.

In a second aspect, an embodiment of the disclosure further provides a sharing apparatus, comprising:
  a sharing operation receiving module, configured to receive a sharing operation for sharing a target work to a first target sharing object;
  a sharing module, configured to send, in response to the sharing operation, the target work to the first target sharing object in a form of chat message; and
  a message control display module, configured to display, in response to sending the target work to the first target sharing object in a form of instant messaging message, a message control corresponding to the first target sharing object, wherein the message control is configured to send an instant messaging message by displaying an instant messaging message input region.

In a third aspect, an embodiment of the disclosure further provides an electronic device, including:
  a processor; and
  a memory, configured to store a program.

The program, when executed by the processor, causes the processor to implement the sharing method according to these embodiments of the disclosure.

In a fourth aspect, an embodiment of the disclosure further provides a computer-readable storage medium, storing a computer program. The computer program, when executed by a processor, implements the sharing method according to these embodiments of the disclosure.

In a fifth aspect, an embodiment of the disclosure further provides a computer program product. The computer program product, when executed by a computer, causes the computer to implement the sharing method according to these embodiments of the disclosure.

BRIEF DESCRIPTION OF THE DRAWINGS

In the accompanying drawings, same or similar reference numerals denote same or similar elements. It should be understood that the accompanying drawings are illustrative, and components and elements may not necessarily be drawn to scale.

FIG. 7 is a schematic diagram of a sharing panel according to an embodiment of the disclosure;

FIG. 8 is a schematic diagram of a message panel according to an embodiment of the disclosure;

DETAILED DESCRIPTION OF EMBODIMENTS

Embodiments of the disclosure will be described with reference to the accompanying drawings below. Although the accompanying drawings show some embodiments of the disclosure, it should be understood that the disclosure may be implemented in various forms, and should not be construed as being limited to the embodiments stated herein. It should be understood that the accompanying drawings and the embodiments of the disclosure are for exemplary purposes only.

It should be understood that the steps recorded in the method implementations in the disclosure may be performed in different orders and/or in parallel. In addition, the method implementations may include additional steps and/or omit the execution of the shown steps.

The term "including" and variations thereof used in this specification are open-ended, namely "including but not limited to". The term "based on" is interpreted as "at least partially based on". The term "an embodiment" means "at least one embodiment"; the term "another embodiment" means "at least one additional embodiment"; and the term "some embodiments" means "at least some embodiments". The related definitions of other terms will be provided in the subsequent description.

It should be noted that "first," "second," and other concepts mentioned in the disclosure are only for distinguishing different apparatuses, modules, or units, and are not intended to limit the order or relation of interdependence of functions performed by these apparatuses, modules, or units.

It should be noted that modifications such as "a" and "a plurality of" mentioned in the disclosure are indicative, and those skilled in the art should understand that unless otherwise explicitly specified in the context, it should be interpreted as "one or more".

The names of messages or information exchanged between multiple apparatuses in the implementations of the disclosure are provided for illustrative purposes only, and are not intended to limit the scope of these messages or information.

As described above, in the related art, when watching a video, users may select friends in batches to share the video they are currently watching, and may input a message before sharing, so as to leave a message for the selected friends during sharing. However, in the related art, the way for the users to leave messages for the shared video is relatively simple and may not meet the needs of the users.

Figure 1:
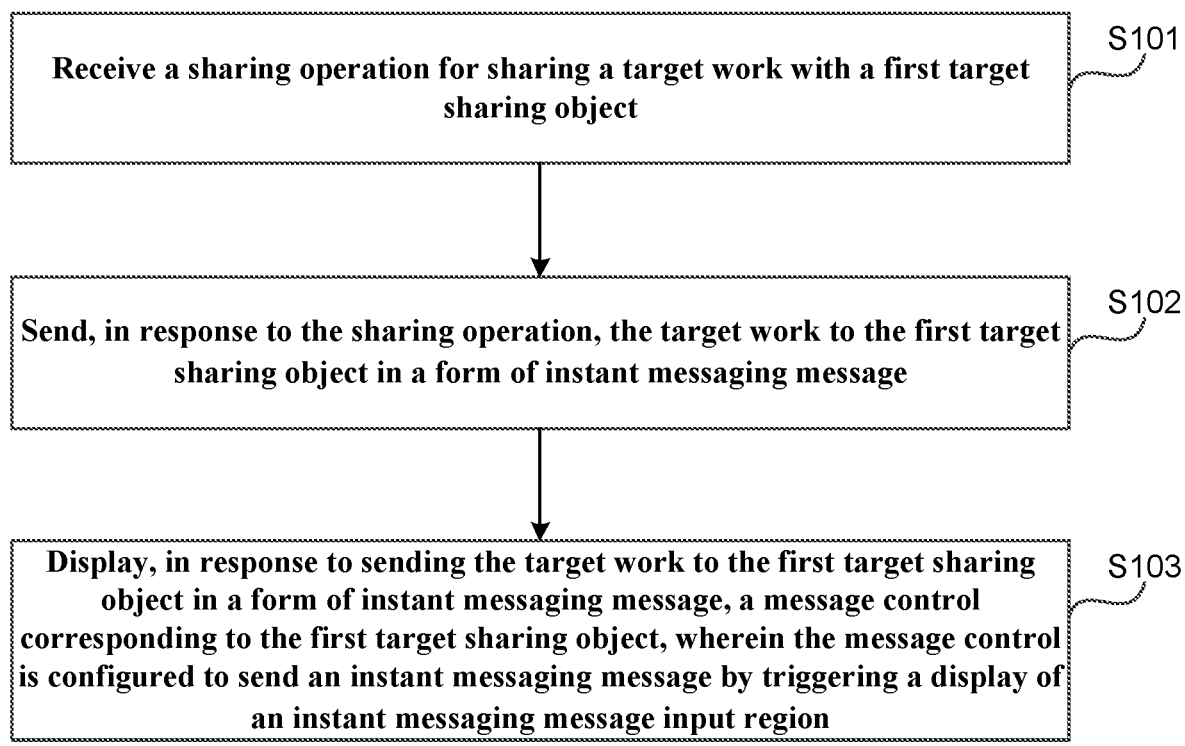
FIG. 1 is a schematic flowchart of a sharing method according to an embodiment of the disclosure.

FIG. 1 is a schematic flowchart of a sharing method according to embodiments of the disclosure. The method may be executed by a sharing apparatus. The apparatus may be implemented by software and/or hardware, and may be configured in an electronic device, such as a mobile phone or a tablet computer. The sharing method provided by these embodiments of the disclosure is applicable to a scenario where published or viewed works are shared with other objects. As shown in FIG. 1, the sharing method provided by these embodiments of the disclosure may comprise:

S101: receiving a sharing operation for sharing a target work to a first target sharing object.

The first target sharing object may be understood as an object with which a user intends to share the target work, such as another user or message group with which the user intends to share the target work. Correspondingly, the target work may be a work that the user intends to share, which may be a work published by the user, another user, or an operator, such as a video, an audio, and an article published by the user, the other user or the operator. The sharing operation may be an operation that instructs an electronic device to share the target work with the first target sharing object, such as an operation of triggering a sharing control corresponding to the first target sharing object, or an operation of triggering the sharing control after the first target sharing object is selected as a sharing object.

Exemplarily, the user may watch the target work, and triggers the sharing control corresponding to the first target sharing object, or selects the first target sharing object as the sharing object and triggers the sharing control when the user intends to share the target work with the first target sharing object. Correspondingly, when an operation that the user triggers the sharing control is detected, the electronic device may determine that the sharing operation is received, take the work targeted by the sharing operation as the target work, and take the sharing object targeted by the sharing operation as the first target sharing object.

S102: in response to the sharing operation, sending the target work to the first target sharing object in a form of instant messaging message.

Exemplarily, when the sharing operation of the user is received, the electronic device may send the target work to the first target sharing object in a form of instant messaging message, such as sending a sharing request to a server so as to request the server to send the target work to the first target sharing object in a form of instant messaging message. Correspondingly, after the sharing request sent by the electronic device being received, the server may obtain the target work according to a work identification carried in the sharing request, and send, based on an object identification carried in the sharing request, the target work to the first target sharing object corresponding to the object identification in a form of instant messaging message, thereby sharing the target work to the first target sharing object.

S103: in response to sending the target work to the first target sharing object in a form of instant messaging message, displaying a message control corresponding to the first target sharing object, wherein the message control is configured to send an instant messaging message by triggering a display of an instant messaging message input region.

Exemplarily, after the target work is shared with the first target sharing object, the message control corresponding to the first target sharing object may be displayed. For example, the message control corresponding to the first target sharing object is displayed in a current interface or a sharing panel. Therefore, the user may trigger the message control to instruct the electronic device to display the instant messaging message input region, so as to send the instant messaging message to the first target sharing object and/or other target sharing objects of the target work. For example, the instant messaging message may be a video, audio, picture, text, etc.

In these embodiments, by displaying the message control corresponding to the target sharing object after the user shares the target work to the target sharing object, the user may still leave messages one or more times to the target sharing object in the current interface after sharing is completed, or leave messages to different target sharing objects in a targeted manner without accessing an instant messaging interface with the target sharing object or leaving the same message to all the target sharing objects, thereby simplifying the operation of the user needed for messages after sharing, and meeting diverse messaging requirements of the user.

In an implementation, the step of displaying a message control corresponding to the first target sharing object comprises: displaying a message control by switching the sharing control corresponding to the first target sharing object to the message control; or, displaying the message control corresponding to the first target sharing object in the current interface, and maintaining the display of the sharing control corresponding to the first target sharing object in the current interface.

Figure 2:
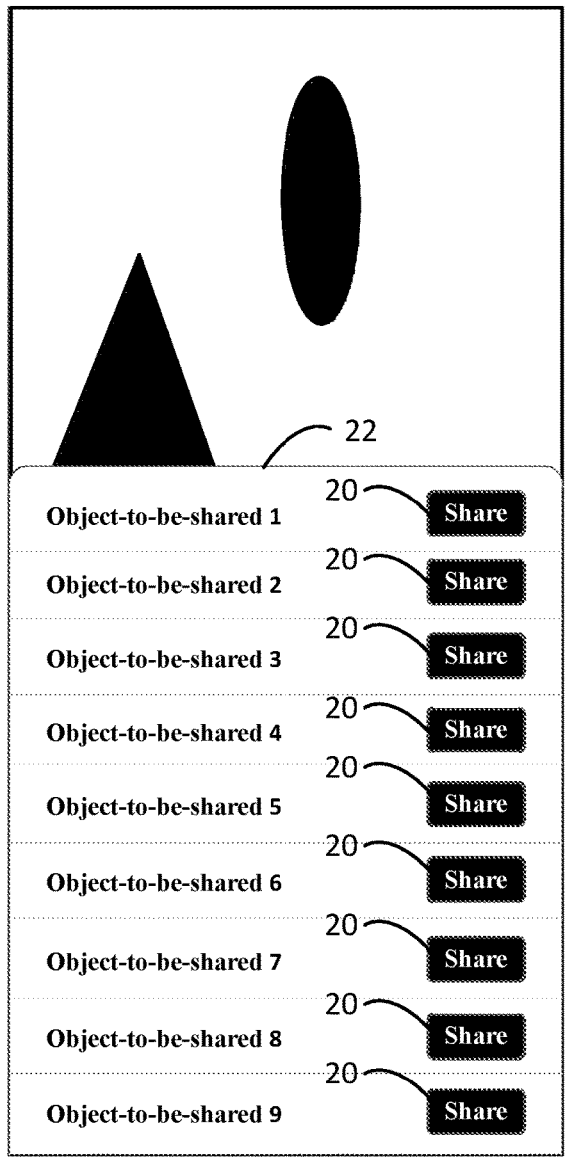
FIG. 2 is a schematic diagram of displaying a sharing control according to an embodiment of the disclosure.
Figure 3:
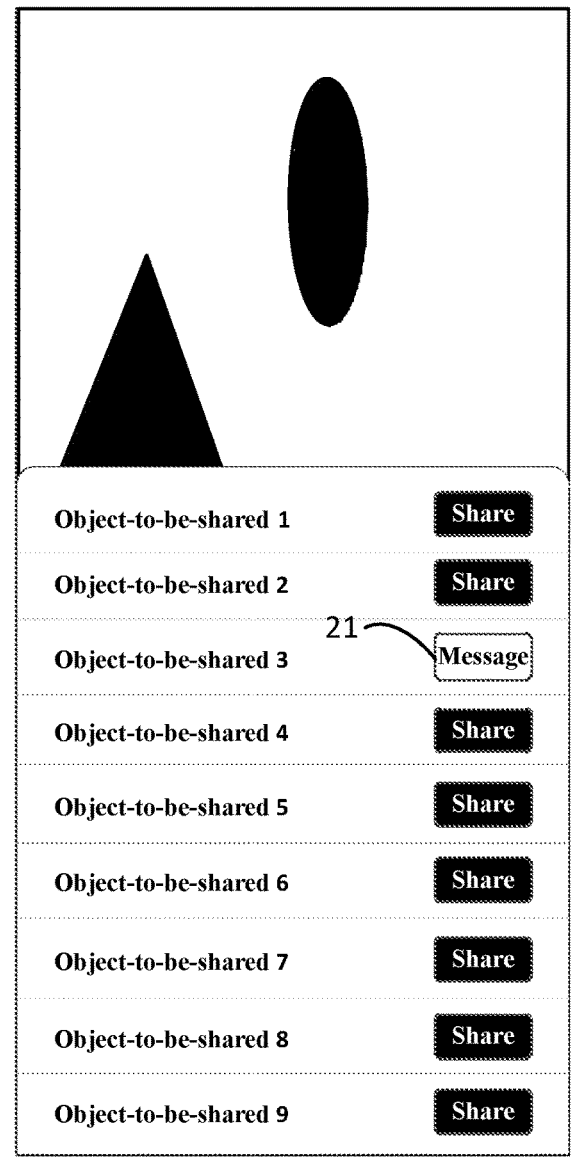
FIG. 3 is a schematic diagram of displaying a message control according to an embodiment of the disclosure.

In the above implementation, as shown in FIG. 2, sharing controls 20 corresponding to objects-to-be-shared (including the first target sharing object) may be displayed in the current interface. Accordingly, after the target work is shared with the first target sharing object, the sharing control 20 displayed in the current interface that corresponds to the first target sharing object may be switched to a message control 21 corresponding to the first target sharing object and the message control 21 is displayed, that is, the display of the sharing control 20 corresponding to the first target sharing object displayed in the current interface is stopped, and the message control 21 corresponding to the first target sharing object is displayed in the current interface, as shown in FIG.

Figure 4:
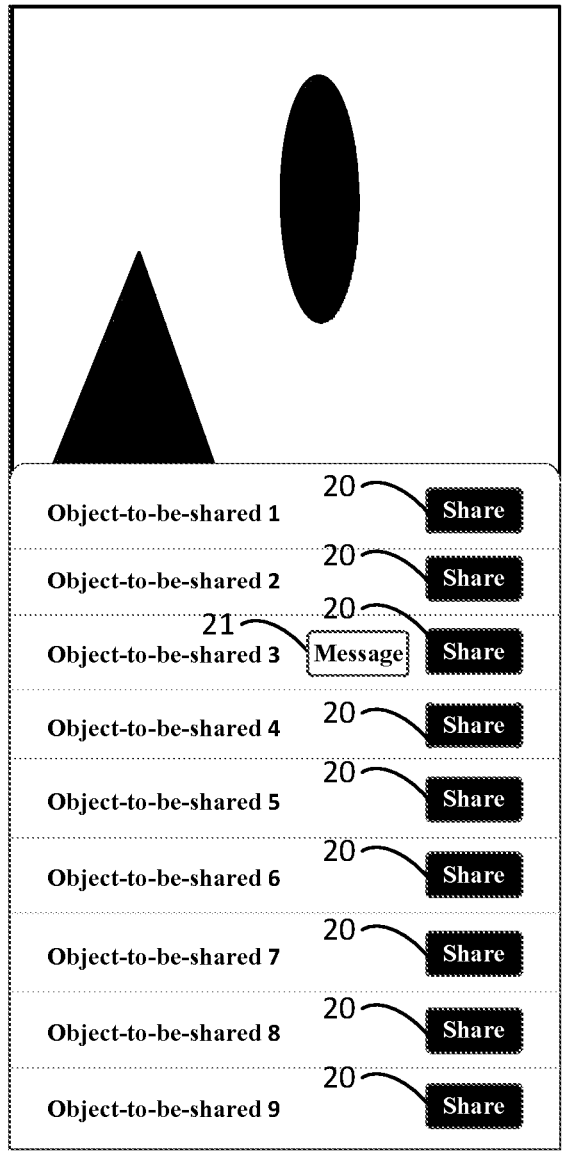
FIG. 4 is a schematic diagram of displaying another message control according to an embodiment of the disclosure.

3 (taking a third object-to-be-shared being the first target sharing object as an example in the figure). The message control 21 corresponding to the first target sharing object may be additionally displayed in the current interface, and the display of the sharing control 20 corresponding to the first target sharing object in the current interface is maintained, as shown in FIG. 4 (taking a third object-to-be-shared being the first target sharing object as an example in the figure).

Figure 5:
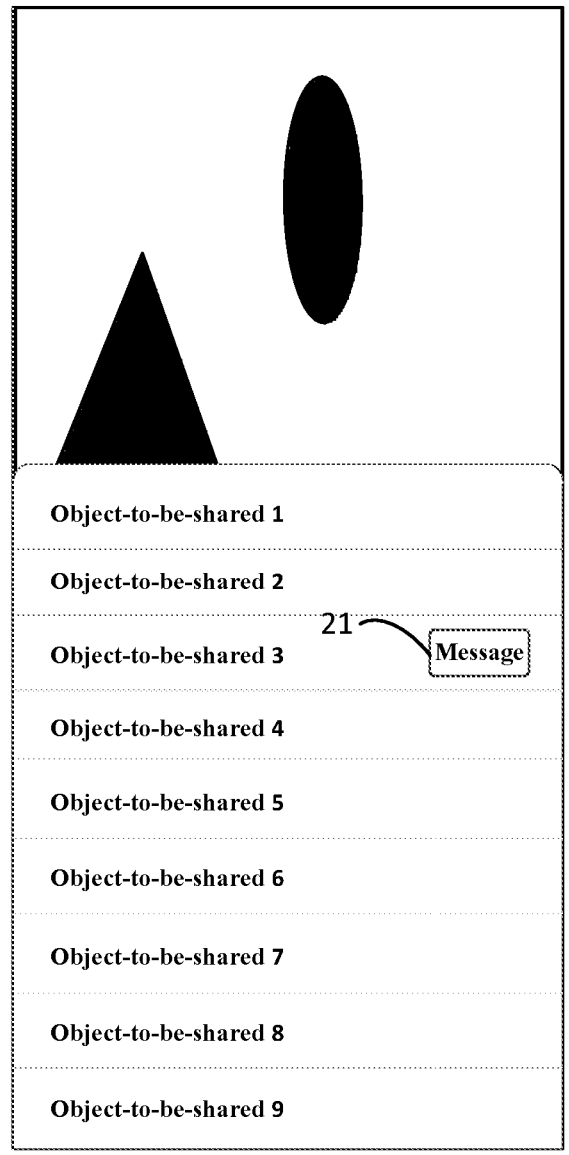
FIG. 5 is a schematic diagram of displaying another message control according to an embodiment of the disclosure.

It should be understood that when the sharing control corresponding to the first target sharing object is not displayed in the current interface, after the target work is shared with the first target sharing object, the message control 21 corresponding to the first target sharing object may be directly displayed in the current interface, as shown in FIG. 5.

According to the sharing method provided by these embodiments, the sharing operation for sharing the target work to the first target sharing object is received; in response to the sharing operation, the target work is sent to the first target sharing object in a form of instant messaging message; and in response to sending the target work to the first target sharing object in a form of instant messaging message, the message control corresponding to the first target sharing object is displayed, wherein the message control is configured to send the instant messaging message by trigger the display of the instant messaging message input region. By adopting the above technical solution in these embodiments, after the operation of sharing the target work to the object is completed, the message control corresponding to the object is displayed in the current sharing interface of the user to send the message to the object, thereby simplifying user operations and improving interaction efficiency.

Figure 6:
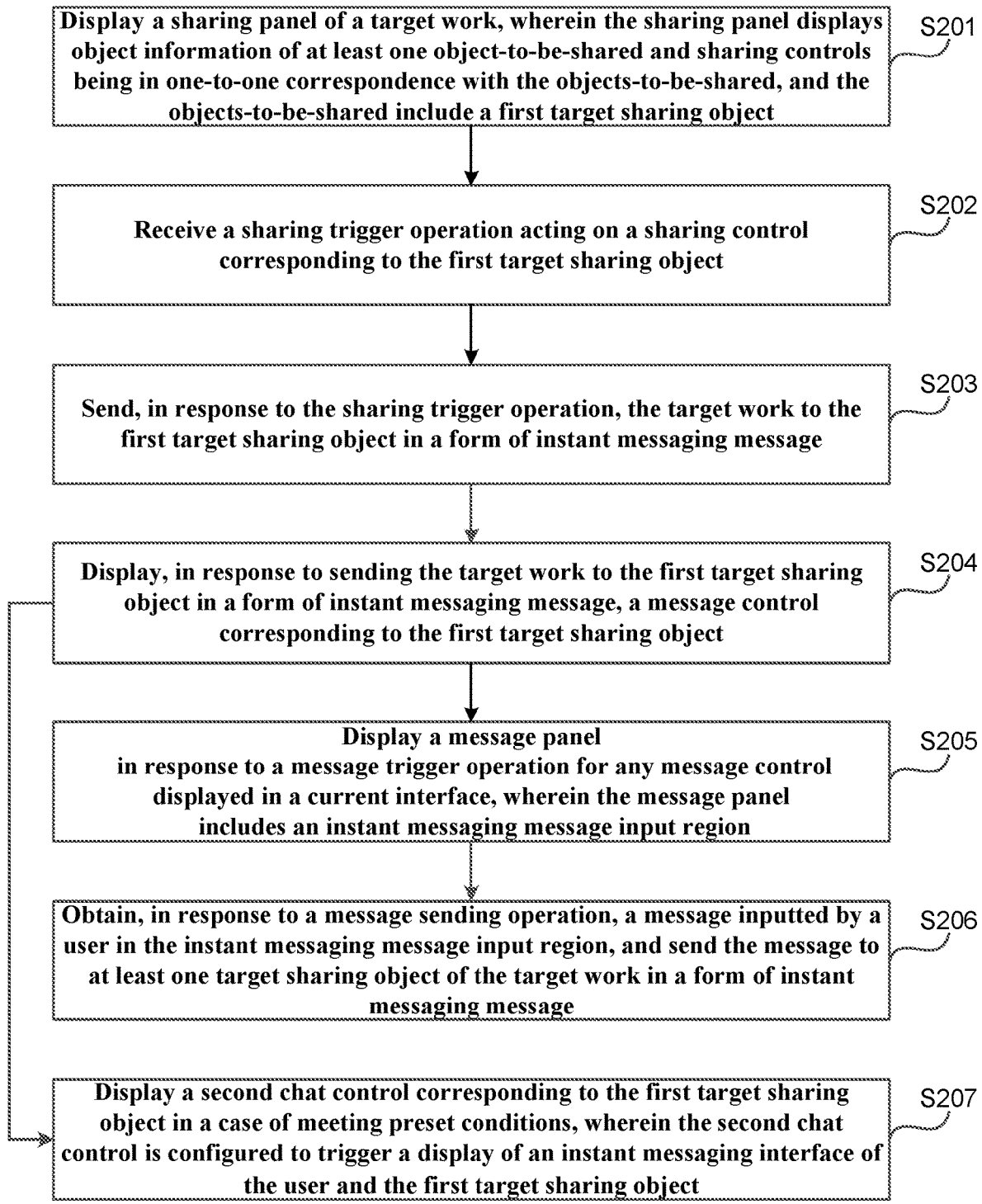
FIG. 6 is a schematic flowchart of another sharing method according to an embodiment of the disclosure.

FIG. 6 is a schematic flowchart of another sharing method according to an embodiment of the disclosure. The solution in these embodiments may be combined with one or more optional solutions in the above embodiment. Optionally, the step of receiving a sharing operation for sharing a target work to a first target sharing object comprises: receiving a sharing trigger operation acting on a sharing control corresponding to the first target sharing object. Before the step of receiving a sharing operation for sharing a target work to a first target sharing object, the method further comprises: displaying a sharing panel of the target work, wherein the sharing panel displays object information of at least one object-to-be-shared and sharing controls being in one-to-one correspondence with the objects-to-be-shared, and the objects-to-be-shared include the first target sharing object.

Optionally, after the step of displaying a message control corresponding to the first target sharing object, the method further comprises: displaying a message panel in response to a message trigger operation for any one of message control displayed in the current interface, wherein the message panel includes an instant messaging message input region; and in response to a message sending operation, obtaining a message inputted by the user in the instant messaging message input region, and sending the message to at least one target sharing object of the target work in a form of instant messaging message.

Optionally, after the step of displaying a message control corresponding to the first target sharing object, the method further comprises: displaying a second chat control corresponding to the first target sharing object in a case of meeting preset conditions, and the second chat control is configured to trigger the display of an instant messaging interface of the user and the first target sharing object.

Correspondingly, as shown in FIG. 6, the sharing method provided by these embodiments may comprises:

S201: displaying a sharing panel of a target work, wherein the sharing panel displays object information of at least one object-to-be-shared and sharing controls being in one-to-one correspondence with the objects-to-be-shared, and the objects-to-be-shared include a first target sharing object.

The object-to-be-shared may be an object with which the user shares the target work, such as another user or message group. The object information of the object-to-be-shared may include a name and/or profile of the object-to-be-shared, etc.

Exemplarily, the user may view the target work, and when the user intends to share the target work, the user instructs an electronic device to display a sharing panel 22 of the target work, such as triggering a forwarding control corresponding to the target work or executing a long-press operation in a display interface of the target work. Correspondingly, after the operation of the user in triggering the forwarding control or the long-press operation of the user is detected, the electronic device displays the sharing panel 22 of the target work, and the object information of the objects-to-be-shared and the sharing controls 20 being in one-to-one correspondence with the objects-to-be-shared are displayed in the sharing panel 22, as shown in FIG. 2.

S202: receiving a sharing trigger operation acting on the sharing control corresponding to the first target sharing object.

S203: in response to the sharing trigger operation, sending the target work to the first target sharing object in a form of instant messaging message.

The sharing trigger operation may be an operation for triggering one sharing control displayed in the sharing panel. The first target sharing object may be an object-to-be-shared corresponding to the sharing control on which the sharing trigger operation acts.

Exemplarily, when the user intends to share the target work with one object-to-be-shared, the sharing control displayed in the sharing panel that corresponds to the object-to-be-shared may be triggered. Correspondingly, when detecting that the user triggers the sharing control displayed in the sharing panel, the electronic device may take the object-to-be-shared corresponding to the sharing control as the first target sharing object, and send the target work to the first target sharing object in a form of instant messaging message.

In these embodiments, by setting the sharing controls being in one-to-one correspondence with the objects-to-be-shared, the user may share the target work with the object-to-be-shared by directly triggering the sharing control corresponding to the corresponding object-to-be-shared without selecting the object-to-be-shared intended to be shared and then triggering the sharing control for sharing, thereby simplifying the operation executed by the user in the sharing process, increasing the target work sharing speed, and improving interaction efficiency.

S204: in response to sending the target work to the first target sharing object in a form of instant messaging message, displaying a message control corresponding to the first target sharing object, and performing S205 or S207, wherein the message control is configured to send an instant messaging message by triggering the display of an instant messaging message input region.

It should be understood that in these embodiments, the message control corresponding to the first target sharing object may be displayed within the sharing panel or outside the sharing panel. These embodiments only take displaying the message control corresponding to the first target sharing object within the sharing panel as an example for descriptions.

S205: displaying a message panel in response to a message trigger operation for any one of message controls displayed in the current interface, wherein the message panel includes an instant messaging message input region.

Exemplarily, after the target work is shared with at least one first target sharing object based on at least one sharing trigger operation of the user, message controls 21 being in one-to-one correspondence with the at least first target sharing object are displayed in the current interface. As shown in FIG. 7, when the user intends to leave a message, the message controls 21 are displayed in the current interface. Correspondingly, after detecting that the user triggers the message control 21 displayed in the current interface, the electronic device may display a message panel 80, and an instant messaging message input region 81 is displayed in the message panel 80 for the user to input a message, as shown in FIG. 8.

S206: in response to a message sending operation, obtaining a message inputted by the user in the instant messaging message input region, and sending the message to at least one target sharing object of the target work in a form of instant messaging message, and the operation is ended.

The message sending operation may be an operation for instructing the electronic device to send the message, such as an operation for triggering a sending control displayed in the message panel or a virtual keyboard. The target sharing object may be understood as an object-to-be-shared with which the user shares the target work, which may include the first target sharing object.

Exemplarily, as shown in FIG. 8, the user may input the message desired to be sent in the message input region 81, and trigger the sending control 82 displayed in the message panel or the virtual keyboard after completing the input. Correspondingly, when detecting that the user triggers the sending control 82, the electronic device may determine that the message sending operation is received, obtains, in response to the message sending operation, the message inputted by the user in the instant messaging message input region 81 of the message panel, and sends the message to at least one target sharing object of the target work in a form of instant messaging message. For example, the message is sent, in a form of instant messaging message, to the target sharing object corresponding to the message control triggered when the user performs the message trigger operation, and/or the message is sent, in a form of instant messaging message, to the target sharing object selected by the user.

In an implementation, the message may be sent to the target sharing object corresponding to the message control triggered when the user performs the message trigger operation, and in this case, the step of sending the message to at least one target sharing object of the target work in a form of instant messaging message may comprise: sending the message, in a form of instant messaging message, to the first target sharing object corresponding to a target message control, wherein the target message control is a message control on which the message trigger operation acts.

In the above implementation, when it is detected that the user triggers the message control, in addition to displaying the instant messaging message input region in the current interface, an instant messaging message log between the user and the first target sharing object corresponding to the triggered message control (i.e., the target message control) may be displayed in the current interface, that is, the current interface may further display the instant messaging message log between the user and the first target sharing object corresponding to the target message control. For example, within the message panel or a region outside the message panel, an instant messaging message log between the user and the first target sharing object corresponding to the triggered message control within the recent set duration may be displayed; or, a set number of most recent instant messaging message logs between them are displayed to be conveniently viewed by the user.

In addition, optionally, the message panel may further display a first chat control. The first chat control is configured to trigger the display of an instant messaging interface between the user and the first target sharing object corresponding to the target message control. Accordingly, the user may directly switch to the instant messaging interface with the first target sharing object by triggering the first chat control without first switching to another interface (e.g., a contacts interface or message interface) and then switching to the instant messaging interface with the first target sharing object from the another interface, thereby simplifying the operation required by the user.

The first chat control may be understood as a chat control corresponding to the first target sharing object corresponding to the message control triggered by the user. The first chat control, when triggered, may be configured to instruct the electronic device to display the instant messaging interface between the user and the first target sharing object.

Exemplarily, when detecting that the user triggers the message control, the electronic device displays the message panel, and displays the instant messaging message input region and the chat control in the message panel. Therefore, when the user intends to access the instant messaging interface with the first target sharing object corresponding to the message control, the chat control may be triggered. Correspondingly, when detecting that the user triggers the chat control displayed in the message panel, the electronic device may switch the current interface to the instant messaging interface between the user and the first target sharing object, thereby facilitating the user to view the instant messaging message log between the user and the first target sharing object, and/or send an instant messaging message to the first target sharing object.

In another implementation, the message may be sent to the target sharing object selected by the user, and in this case, optionally, the message panel displays identification information of at least one second target sharing object. The step of sending the message to at least one target sharing object of the target work in a form of instant messaging message comprises: sending the message, in a form of instant messaging message, to a second target sharing object corresponding to identification information selected by the user.

The second target sharing object may be any other target sharing object in addition to the target sharing object corresponding to the message control triggered by the user. The identification information of the second target sharing object may include a name and/or profile of the second target sharing object, etc.

In the above implementation, if the user shares the target work with a plurality of target objects, that is, there are second target sharing objects in addition to the first target sharing object corresponding to the message control triggered by the user, a second electronic device may display identification information of each second target sharing object in the message panel when displaying the message panel. Accordingly, the user may select the identification information of the second target sharing object to which the user intends to send the message so as to select the corresponding second target sharing object, and perform the message sending operation. Correspondingly, when receiving the message sending operation of the user, the electronic device may send the message inputted by the user in the instant messaging message input region to the second target sharing object corresponding to the identification information selected by the user.

Further, the message panel may further display identification information of the first target sharing object corresponding to the target message control, such that the user may select or deselect the identification information of the first target sharing object as needed. Correspondingly, the electronic device may send or not send, based on the selection of the user, the message inputted by the user in the instant messaging message input region to the first target sharing object.

It should be understood that in these embodiments, the identification information of the first target sharing object corresponding to the target message control may also not be displayed in the message panel. In this case, the identification information of the first target sharing object may be considered as a selected state by default. That is, when receiving the message sending operation of the user, the electronic device may send the message inputted by the user in the instant messaging message input region to the first target sharing object corresponding to the target message control and the second target sharing object corresponding to the identification information selected by the user.

S207: displaying a second chat control corresponding to the first target sharing object in a case of meeting preset conditions, and the second chat control is configured to trigger the display of an instant messaging interface of the user and the first target sharing object.

In these embodiments, when the preset conditions are meet, the second chat control corresponding to the first target sharing object may also be displayed, such that the user may switch to the instant messaging interface with the first target sharing object by triggering the second chat control, thereby simplifying the operation required by the user to access the instant messaging interface.

The second chat control may be a chat control corresponding to the first target sharing object meeting the preset conditions. The second chat control, when triggered, may be configured to instruct the electronic device to display the instant messaging interface between the user and the first target sharing object.

The preset conditions may be set as needed. Exemplarily, the preset conditions include at least one of: a number of triggering times of the message control corresponding to the first target sharing object reaching a preset times threshold; interaction data between the user and the first target sharing object meeting a preset condition; and the user having unread messages sent by the first target sharing object. That is, the chat control corresponding to the first target sharing object may be displayed when the operation of triggering a message control corresponding to a target sharing object reaches the preset times threshold, interaction data between the user and the target sharing object meets the preset condition (e.g., the number of interaction times reaches a preset interaction times threshold and/or an interaction frequency reaches a preset interaction frequency threshold), and/or the user has unread messages sent by the target sharing object.

Exemplarily, the electronic device displays the chat control corresponding to the first target sharing object meeting the preset conditions. Therefore, when the user intends to access the instant messaging interface with the first target sharing object, the chat control corresponding to the first target sharing object may be triggered. Correspondingly, when detecting that the user triggers the chat control, the electronic device may switch the current interface to the instant messaging interface between the user and the first target sharing object corresponding to the chat control, thereby facilitating the user to view the instant messaging message log between the user and the first target sharing object, and/or send the instant messaging message to the first target sharing object.

According to the sharing method provided by these embodiments, by displaying the message control, the user may still send messages to other users by triggering the message control after sharing is completed, thereby simplifying the operation required by the user to leave messages after sharing, and meeting requirements of the user for leaving different messages to different users in a targeted manner.

Figure 9:
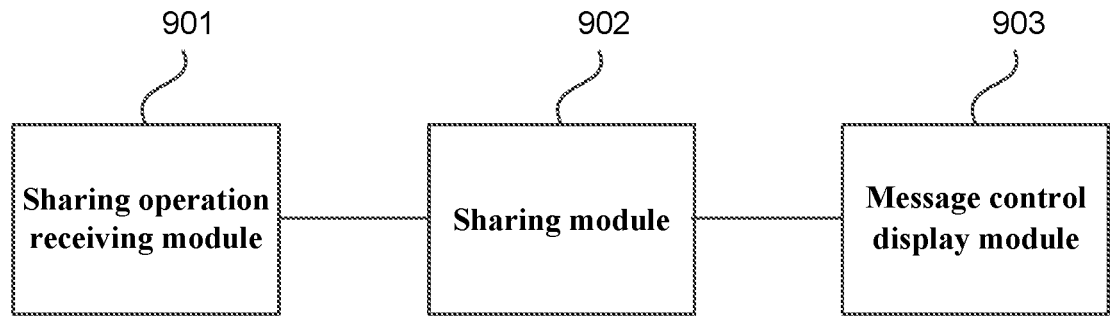
FIG. 9 is a structural block diagram of a sharing apparatus according to an embodiment of the disclosure.

FIG. 9 is a structural block diagram of a sharing apparatus according to an embodiment of the disclosure. The apparatus may be implemented by software and/or hardware, and may be configured in an electronic device, such as a mobile phone or a tablet computer. Target work sharing and message leaving may be implemented by executing the sharing method. As shown in FIG. 9, the sharing apparatus provided by these embodiments may include: a sharing operation receiving module 901, a sharing module 902, and a message control display module 902.

The sharing operation receiving module 901 is configured to receive a sharing operation for sharing a target work to a first target sharing object;

the sharing module 902 is configured to send, in response to the sharing operation, the target work to the first target sharing object in a form of chat message; and the message control display module 902 is configured to display, in response to sending the target work to the first target sharing object in a form of instant messaging message, a message control corresponding to the first target sharing object, wherein the message control is configured to send an instant messaging message by displaying an instant messaging message input region.

According to the sharing apparatus provided by these embodiments, the sharing operation receiving module receives the sharing operation for sharing the target work to the first target sharing object; the sharing module sends, in response to the sharing operation, the target work to the first target sharing object in a form of instant messaging message; and the message control display module displays, in response to sending the target work to the first target sharing object in a form of instant messaging message, the message control corresponding to the first target sharing object, wherein the message control is configured to send the instant messaging message by triggering a display of the instant messaging message input region. By adopting the above technical solution in these embodiments, after the operation of sharing the target work to the object is completed, the message control corresponding to the object is displayed in the current sharing interface of the user to send the message to the object, thereby simplifying user operations and improving interaction efficiency.

In the above solution, the message control display module 903 may be configured to display the message control corresponding to the first target sharing object through the following manner: displaying a message control by switching a sharing control corresponding to the first target sharing object to the message control; or displaying the message control corresponding to the first target sharing object in a current interface, and maintaining a display of the sharing control corresponding to the first target sharing object in the current interface.

In the above solution, the sharing operation receiving module 901 may be configured to receive the sharing operation for sharing the target work to the first target sharing object through the following manner: receiving a sharing trigger operation acting on the sharing control corresponding to the first target sharing object. The sharing apparatus provided by these embodiments may further comprise: a sharing panel display module, configured to display a sharing panel of the target work before receiving the sharing operation for sharing the target work to the first target sharing object, wherein the sharing panel displays object information of at least one object-to-be-shared and sharing controls being in one-to-one correspondence with the objects-to-be-shared, wherein the objects-to-be-shared comprise the first target sharing object.

In an embodiment, the sharing apparatus provided by these embodiments may further include: a message panel display module, configured to display a message panel in response to a message trigger operation for any one of message controls displayed in the current interface, wherein the message panel includes an instant messaging message input region; and a message sending module, configured to, in response to a message sending operation, obtain message information inputted by a user in the instant messaging message input region and send the message information to at least one target sharing object of the target work in a form of instant messaging message.

In the above solution, the message sending module may be configured to send the message to the first target sharing object through the following manner: send, in a form of instant messaging message, the message to a first target sharing object corresponding to a target message control, wherein the target message control is a message control on which the message trigger operation acts.

In the above solution, the current interface may display an instant messaging message log between the user and the first target sharing object corresponding to the target message control.

In the above solution, the message panel may further display a first chat control. The first chat control may be configured to trigger the display of an instant messaging interface between the user and the first target sharing object corresponding to the target message control.

In the above solution, the message panel may display identification information of at least one second target sharing object. The message sending module may be configured to send the message to the second target sharing object by: sending the message, in a form of instant messaging message, to a second target sharing object corresponding to identification information selected by the user.

In an embodiment, the sharing apparatus provided by these embodiments may further comprise: a chat control display module, configured to display a second chat control corresponding to the first target sharing object in a case of meeting preset conditions after displaying a message control corresponding to the first target sharing object. The second chat control is configured to trigger the display of an instant messaging interface of the user and the first target sharing object.

In the above solution, the preset conditions may include at least one of: a number of triggering times of the message control corresponding to the first target sharing object reaching a preset times threshold; interaction data between the user and the first target sharing object meeting a preset condition; and the user having unread messages sent by the first target sharing object.

The sharing apparatus provided by these embodiments of the disclosure may execute the sharing method provided by any embodiment of the disclosure, and has corresponding functional modules and effects for executing the sharing method. For technical details that are not described in detail in these embodiments, reference may be made to the sharing method provided by any embodiment of the disclosure.

Figure 10:
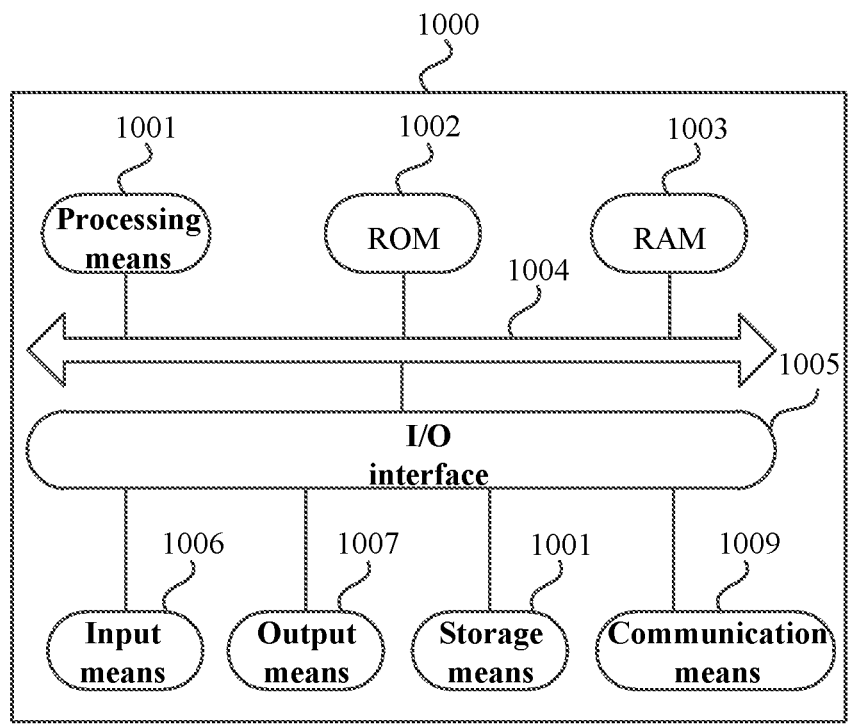
FIG. 10 is a structural schematic diagram of an electronic device according to an embodiment of the disclosure.

Referring to FIG. 10 below, FIG. 10 illustrates a structural schematic diagram of an electronic device (e.g., a terminal device) 1000 suitable for implementing embodiments of the disclosure. The terminal device in these embodiments of the disclosure may include mobile terminals such as a mobile phone, a notebook computer, a digital radio receiver, a personal digital assistant (PDA), a portable Android device (PAD), a portable media player (PMP), and a vehicle-mounted terminal (e.g., a vehicle-mounted navigation terminal), and fixed terminals such as a digital television (digital TV) and a desk computer. The electronic device shown in FIG. 10 is merely an example.

As shown in FIG. 10, the electronic device 1000 may include a Processing means (e.g., a central processing unit and a graphics processing unit) 1001, which may perform various appropriate actions and processing according to programs stored on a read only memory (ROM) 1002 or loaded from a Storage means 1008 into a random access memory (RAM) 1003. The RAM 1003 further stores various programs and data required for the operation of the electronic device 1000. The Processing means 1001, the ROM 1002, and the RAM 1003 are connected to one another through a bus 1004. An input/output (I/O) interface 1005 is also connected to the bus 1004.

Typically, the following apparatuses may be connected to the I/O interface 1005: an Input means 1006, including, for example, a touchscreen, a touchpad, a keyboard, a mouse, a camera, a microphone, an accelerometer, and a gyroscope; an Output means 1007, including, for example, a liquid crystal display (LCD), a speaker, and a vibrator; the Storage means 1008, including, for example, a magnetic tape and a hard drive; and a Communication means 1009. The Communication means 1009 may allow the electronic device 1000 to be in wireless or wired communication with other devices for data exchange. Although FIG. 10 illustrates the electronic device 1000 with various apparatuses, it should be understood that it is not necessary to implement or have all the shown apparatuses. Alternatively, more or fewer apparatuses may be implemented or provided.

In an embodiment, according to these embodiments of the disclosure, the foregoing process described with reference to the flowchart may be implemented as a computer software program. For example, an embodiment of the disclosure includes a computer program product including a computer program carried on a non-transitory computer-readable medium. The computer program includes program code for executing the method shown in the flowchart. In these embodiments, the computer program may be downloaded and installed from the network by the Communication means 1009, or installed from the Storage means 1008, or installed from the ROM 1002. The computer program, when executed by the Processing means 1001, performs the above functions limited in the method in these embodiments of the disclosure.

It should be noted that the computer-readable medium in the disclosure may be a computer-readable signal medium, or a computer-readable storage medium, or any combination thereof. The computer-readable storage medium may be, for example, electrical, magnetic, optical, electromagnetic, infrared or semiconductor systems, apparatuses or devices, or any combination thereof. Examples of the computer-readable storage medium may include: an electrical connection with at least one wire, a portable computer disk, a hard drive, a random access memory (RAM), a read only memory (ROM), an erasable programmable read only memory (e.g., an electronic programmable read only memory (EPROM) or a flash memory), fiber optics, a portable compact disc-read only memory (CD-ROM), an optical storage device, a magnetic storage device, or any proper combination of the above. In the disclosure, the computer-readable storage medium may be a tangible medium including or storing a program, and the program may be used by an instruction execution system, apparatus, or device, or used in conjunction with the instruction execution system, apparatus, or device. However, in the disclosure, the computer-readable signal medium may include data signals propagated in a baseband or propagated as a part of a carrier wave, which carry computer-readable program code. The propagated data signals may have a plurality of forms, including electromagnetic signals, optical signals, or any proper combination of the above. The computer-readable signal medium may also be a computer-readable medium other than the computer-readable storage medium. The computer-readable signal medium may send, propagate, or transmit the program used by the instruction execution system, apparatus, or device, or used in conjunction with the instruction execution system, apparatus, or device. The program code included in the computer-readable medium may be transmitted by a proper medium including a wire, an optical cable, radio frequency (RF), etc., or a proper combination of the above.

In some implementations, a client and the server may communicate using any currently known or future-developed network protocols such as a hypertext transfer protocol (HTTP), and may also be in communication connection with digital data in any form or medium (e.g., a communication network). For example, the communication network includes a local area network (LAN), a wide area network (WAN), Internet work (e.g., Internet), a peer-to-peer network (e.g., an ad hoc peer-to-peer network), and any currently known or future-developed networks.

The computer-readable medium may be included in the electronic device; and may separately exist without being assembled in the electronic device.

The computer-readable medium carries at least one program. The at least one program, when executed by the electronic device, enables the electronic device to: receive a sharing operation for sharing a target work to a first target sharing object; send, in response to the sharing operation, the target work to the first target sharing object in a form of instant messaging message; and display, in response to sending the target work to the first target sharing object in a form of instant messaging message, a message control corresponding to the first target sharing object, where the message control is configured to send an instant messaging message by triggering the display of an instant messaging message input region.

The computer program code for executing the operations of the disclosure may be written in one or more programming languages or a combination thereof. The programming languages include object-oriented programming languages such as Java, Smalltalk, C++, as well as conventional procedural programming languages such as "C" or similar programming languages. The program code may be executed entirely or partially on a user computer, executed as a standalone software package, executed partially on the user computer and partially on a remote computer, or entirely executed on the remote computer or server. In a case of involving the remote computer, the remote computer may be connected to the user computer via any type of network, including a local area network (LAN) or wide area network (WAN), or may be connected to an external computer (e.g., utilizing an Internet service provider for Internet connectivity).

The flowcharts and block diagrams in the accompanying drawings illustrate system architectures, functions, and operations possibly implemented by the system, method and computer program product according to the various embodiments of the disclosure. In this regard, each block in the flowcharts or block diagrams may represent a module, a program segment, or a portion of code, and the module, program segment, or portion of code includes one or more executable instructions for implementing specified logical functions. It should be noted that in some alternative implementations, functions marked in the blocks may also occur in an order different from that marked in the accompanying drawings. For example, two consecutively-shown blocks may actually be executed in parallel basically, but sometimes may also be executed in a reverse order, which depends on involved functions. It should be further noted that each block in the block diagrams and/or flowcharts as well as a combination of the blocks in the block diagrams and/or flowcharts may be implemented by using a dedicated hardware-based system that executes specified functions or operations, or using a combination of special hardware and computer instructions.

The units described in the embodiments of the disclosure may be implemented through software or hardware. The name of the module does not limit the unit in certain cases.

The functions described above in this specification may be at least partially executed by at least one hardware logic component. For example, exemplary hardware logic components that may be used include: a field-programmable gate array (FPGA), an application specific integrated circuit (ASIC), application specific standard parts (ASSPs), a system on chip (SOC), a complex programmable logic device (CPLD), etc.

In the context of the disclosure, a machine-readable medium may be a tangible medium that may contain or store a program, and the program may be used by the instruction execution system, apparatus, or device, or used in conjunction with the instruction execution system, apparatus, or device. The machine-readable medium may be a machine-readable signal medium or a machine-readable storage medium. The machine-readable medium may include: electronic, magnetic, optical, electromagnetic, infrared, or semiconductor systems, apparatuses, or devices, or a proper combination of the above. Examples of the machine-readable storage medium may include: an electrical connection based on at least one wire, a portable computer disk, a hard drive, a random access memory (RAM), a read only memory (ROM), an erasable programmable read only memory (EPROM or a flash memory), fiber optics, a portable compact disc-read only memory (CD-ROM), an optical storage device, a magnetic storage device, or a proper combination of the above.

According to one or more embodiments of the disclosure, Example 1 provides a sharing method, comprising:
    receiving a sharing operation for sharing a target work to
      a first target sharing object;

sending, in response to the sharing operation, the target work to the first target sharing object in a form of instant messaging message; and displaying, in response to sending the target work to the first target sharing object in a form of instant messaging message, a message control corresponding to the first target sharing object, wherein the message control is configured to send an instant messaging message by triggering a display of an instant messaging message input region.

According to one or more embodiments of the disclosure, Example 2 is based on the method according to Example 1, and the step of displaying a message control corresponding to the first target sharing object comprises:

displaying a message control by switching a sharing control corresponding to the first target sharing object to the message control; or displaying the message control corresponding to the first target sharing object in a current interface, and maintaining a display of the sharing control corresponding to the first target sharing object in the current interface.

According to one or more embodiments of the disclosure, Example 3 is based on the method according to Example 2, and the step of receiving a sharing operation for sharing a target work to a first target sharing object comprises:

receiving a sharing trigger operation acting on the sharing control corresponding to the first target sharing object; and before receiving the sharing operation for sharing the target work to the first target sharing object, the method further comprises:

displaying a sharing panel of the target work, wherein the sharing panel displays object information of at least one object-to-be-shared and sharing controls being in one-to-one correspondence with the objects-to-be-shared, wherein the objects-to-be-shared comprise the first target sharing object.

According to one or more embodiments of the disclosure, Example 4 is based on the method according to any one of Examples 1 to 3, after the step of displaying a message control corresponding to the first target sharing object, the method further comprises:

displaying a message panel in response to a message trigger operation for any one of message controls displayed in the current interface, wherein the message panel comprises an instant messaging message input region; and in response to a message sending operation, obtaining message information inputted by a user in the instant messaging message input region and sending the message information to at least one target sharing object of the target work in a form of instant messaging message.

According to one or more embodiments of the disclosure, Example 5 is based on the method according to Example 4, and the step of sending the message to at least one target sharing object of the target work in a form of instant messaging message comprises:

sending, in a form of instant messaging message, the message to a first target sharing object corresponding to a target message control, wherein the target message control is a message control on which the message trigger operation acts.

According to one or more embodiments of the disclosure, Example 6 is based on the method according to Example 5, the current interface displays an instant messaging message log between the user and the first target sharing object corresponding to the target message control.

According to one or more embodiments of the disclosure, Example 7 is based on the method according to Example 5, the message panel displays a first chat control, wherein the first chat control is configured to trigger a display of an instant messaging interface between the user and the first target sharing object corresponding to the target message control.

According to one or more embodiments of the disclosure, Example 8 is based on the method according to Example 4, the message panel displays identification information of at least one second target sharing object, and the sending the message to at least one target sharing object of the target work in a form of instant messaging message comprises:

sending, in a form of instant messaging message, the message to a second target sharing object corresponding to identification information selected by the user.

According to one or more embodiments of the disclosure, Example 9 is based on the method according to any one of Examples 1 to 3, after displaying a message control corresponding to the first target sharing object, the method further comprises:

displaying a second chat control corresponding to the first target sharing object in a case of meeting preset conditions, wherein the second chat control is configured to trigger a display of an instant messaging interface of the user and the first target sharing object.

According to one or more embodiments of the disclosure, Example 10 is based on the method according to Example 9, and the preset conditions include at least one of:

a number of triggering times of the message control corresponding to the first target sharing object reaching a preset times threshold;

interaction data between the user and the first target sharing object meeting a preset condition; and the user having unread messages sent by the first target sharing object.

According to one or more embodiments of the disclosure, Example 11 provides a sharing apparatus, comprising:

a sharing operation receiving module, configured to receive a sharing operation for sharing a target work to a first target sharing object;

a sharing module, configured to send, in response to the sharing operation, the target work to the first target sharing object in a form of chat message; and a message control display module, configured to display, in response to sending the target work to the first target sharing object in a form of instant messaging message, a message control corresponding to the first target sharing object, wherein the message control is configured to send an instant messaging message by displaying an instant messaging message input region.

According to one or more embodiments of the disclosure, Example 12 provides an electronic device, comprising:

a processor; and a memory, configured to store a program.

the program, when executed by the processor, causing the processor to implement the sharing method according to any one of Examples 1 to 10.

According to one or more embodiments of the disclosure, Example 13 provides a computer-readable storage medium. The computer-readable storage medium stores a computer program. The computer program, when executed by a processor, implements the sharing method according to any one of Examples 1 to 10.

According to one or more embodiments of the disclosure, Example 14 provides a computer program product. The computer program product, when executed by a computer, causing the computer to implement the sharing method according to any one of Examples 1 to 10.

We claim:

1. A sharing method, comprising:
   receiving a sharing operation for sharing a target work to a first target sharing object;
   sending, in response to the sharing operation, the target work to the first target sharing object in a form of instant messaging message; and
   displaying, in response to sending the target work to the first target sharing object in a form of instant messaging message, a message control corresponding to the first target sharing object, wherein the message control is configured to send an instant messaging message by triggering a display of an instant messaging message input region.

2. The method according to claim 1, wherein displaying a message control corresponding to the first target sharing object comprises:
   displaying a message control by switching a sharing control corresponding to the first target sharing object to the message control; or
   displaying the message control corresponding to the first target sharing object in a current interface, and maintaining a display of the sharing control corresponding to the first target sharing object in the current interface.

3. The method according to claim 2, wherein receiving a sharing operation for sharing a target work to a first target sharing object comprises:
   receiving a sharing trigger operation acting on the sharing control corresponding to the first target sharing object; and
   before receiving the sharing operation for sharing the target work to the first target sharing object, the method further comprises:
   displaying a sharing panel of the target work, wherein the sharing panel displays object information of at least one object-to-be-shared and sharing controls being in one-to-one correspondence with the objects-to-be-shared, wherein the objects-to-be-shared comprise the first target sharing object.

4. The method according to claim 1, wherein after displaying the message control corresponding to the first target sharing object, the method further comprises:
   displaying a message panel in response to a message trigger operation for any one of message controls displayed in the current interface, wherein the message panel comprises an instant messaging message input region; and
   in response to a message sending operation, obtaining message information inputted by a user in the instant messaging message input region and sending the message information to at least one target sharing object of the target work in a form of instant messaging message.

5. The method according to claim 4, wherein sending the message to at least one target sharing object of the target work in a form of instant messaging message comprises:
   sending, in a form of instant messaging message, the message to a first target sharing object corresponding to a target message control, wherein the target message control is a message control on which the message trigger operation acts.

6. The method according to claim 5, wherein the current interface displays an instant messaging message log between the user and the first target sharing object corresponding to the target message control.

7. The method according to claim 5, wherein the message panel displays a first chat control, wherein the first chat control is configured to trigger a display of an instant messaging interface between the user and the first target sharing object corresponding to the target message control.

8. The method according to claim 4, wherein the message panel displays identification information of at least one second target sharing object, and sending the message to at least one target sharing object of the target work in a form of instant messaging message comprises:
   sending, in a form of instant messaging message, the message to a second target sharing object corresponding to identification information selected by the user.

9. The method according to claim 1, wherein after displaying the message control corresponding to the first target sharing object, the method further comprises:
   displaying a second chat control corresponding to the first target sharing object in a case of meeting preset conditions, wherein the second chat control is configured to trigger a display of an instant messaging interface of the user and the first target sharing object.

10. The method according to claim 9, wherein the preset conditions comprise at least one of:
    a number of triggering times of the message control corresponding to the first target sharing object reaching a preset times threshold;
    interaction data between the user and the first target sharing object meeting a preset condition; and
    the user having unread messages sent by the first target sharing object.

11. An electronic device, comprising:
    a processor; and
    a memory, configured to store a program, and
    the program, when executed by the processor, causing the processor to:
    receive a sharing operation for sharing a target work to a first target sharing object;
    send, in response to the sharing operation, the target work to the first target sharing object in a form of instant messaging message; and
    display, in response to sending the target work to the first target sharing object in a form of instant messaging message, a message control corresponding to the first target sharing object, wherein the message control is configured to send an instant messaging message by triggering a display of an instant messaging message input region.

12. The device according to claim 11, wherein the program causing the processor to display a message control corresponding to the first target sharing object further causes the processor to:
    display a message control by switching a sharing control corresponding to the first target sharing object to the message control; or
    display the message control corresponding to the first target sharing object in a current interface, and maintain a display of the sharing control corresponding to the first target sharing object in the current interface.

13. The device according to claim 12, wherein the program causing the processor to receive a sharing operation for sharing a target work to a first target sharing object further causes the processor to:
    receive a sharing trigger operation acting on the sharing control corresponding to the first target sharing object; and before causing the processor to receive the sharing operation for sharing the target work to the first target sharing object, the program further causes the processor to:
  display a sharing panel of the target work, wherein the sharing panel displays object information of at least one object-to-be-shared and sharing controls being in one-to-one correspondence with the objects-to-be-shared, wherein the objects-to-be-shared comprise the first target sharing object.

14. The device according to claim 11, wherein after causing the processor to display the message control corresponding to the first target sharing object, the program further causes the processor to:
  display a message panel in response to a message trigger operation for any one of message controls displayed in the current interface, wherein the message panel comprises an instant messaging message input region; and
  in response to a message sending operation, obtain message information inputted by a user in the instant messaging message input region and send the message information to at least one target sharing object of the target work in a form of instant messaging message.

15. The device according to claim 14, wherein the program causing the processor to send the message to at least one target sharing object of the target work in a form of instant messaging message further causes the processor to:
  send, in a form of instant messaging message, the message to a first target sharing object corresponding to a target message control, wherein the target message control is a message control on which the message trigger operation acts.

16. The device according to claim 15, wherein the current interface displays an instant messaging message log between the user and the first target sharing object corresponding to the target message control.

17. The device according to claim 15, wherein the message panel displays a first chat control, wherein the first chat control is configured to trigger a display of an instant messaging interface between the user and the first target sharing object corresponding to the target message control.

18. The device according to claim 14, wherein the message panel displays identification information of at least one second target sharing object, and the program causing the processor to send the message to at least one target sharing object of the target work in a form of instant messaging message further causes the processor to:
  send, in a form of instant messaging message, the message to a second target sharing object corresponding to identification information selected by the user.

19. The device according to claim 11, wherein after causing the processor to display the message control corresponding to the first target sharing object, the program further causes the processor to:
  display a second chat control corresponding to the first target sharing object in a case of meeting preset conditions, wherein the second chat control is configured to trigger a display of an instant messaging interface of the user and the first target sharing object.

20. A non-transitory computer-readable storage medium, wherein the computer-readable storage medium stores a computer program, and the computer program, when executed by a processor, causes the processor to:
  receive a sharing operation for sharing a target work to a first target sharing object;
  send, in response to the sharing operation, the target work to the first target sharing object in a form of instant messaging message; and
  display, in response to sending the target work to the first target sharing object in a form of instant messaging message, a message control corresponding to the first target sharing object, wherein the message control is configured to send an instant messaging message by triggering a display of an instant messaging message input region.

* * * * *